Figure 1:
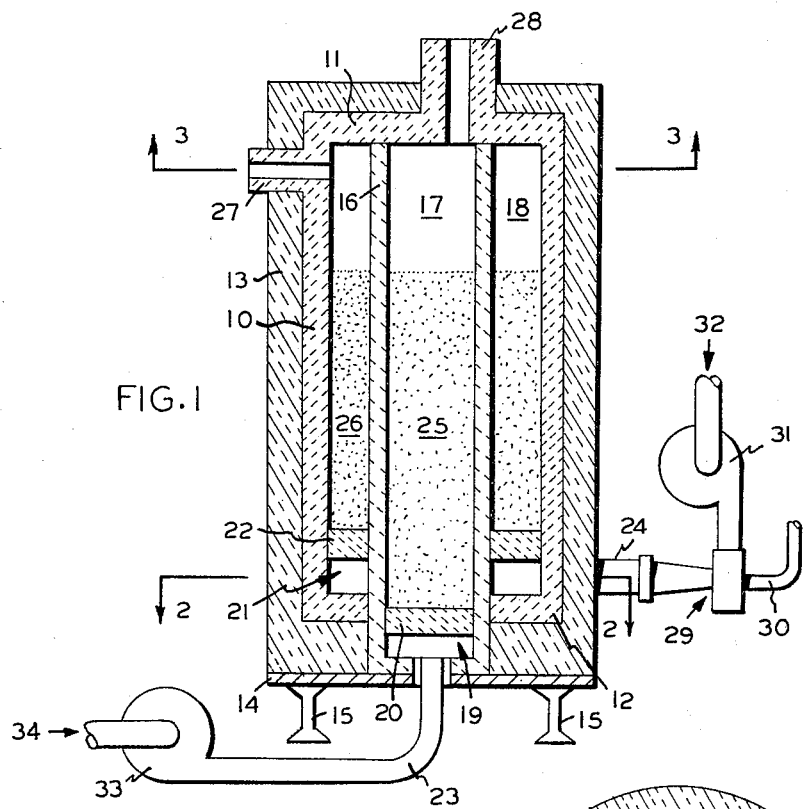

Oct. 18, 1966     A. E. DANIELL ETAL     3,279,887
APPARATUS AND PROCESS FOR MANUFACTURING THERMAL BLACK
Filed Dec. 26, 1962

INVENTORS
ALTON E. DANIELL
BY JACK WALKER

*Walter H. Schneider*

ATTORNEY

United States Patent Office 3,279,887
Patented Oct. 18, 1966

3,279,887
APPARATUS AND PROCESS FOR MANUFACTURING THERMAL BLACK
Alton E. Daniell and Jack Walker, Houston, Tex., assignors, by mesne assignments, to Ashland Oil & Refining Company, Ashland, Ky., a corporation of Kentucky
Filed Dec. 26, 1962, Ser. No. 246,899
9 Claims. (Cl. 23—209.4)

This invention relates to the production of carbon black. More particularly it relates to thermal methods and apparatus for making carbon black. Still more particularly it relates to making carbon black in a fluidized thermal reactor.

The bulk of world production of carbon black is carried out in accordance with three basic methods, the impingement method, the furnace combustion method, and the thermal method, with which the present invention is concerned. The thermal method involves heating a heat exchange medium to the temperature at which a selected hydrocarbon feed stock will decompose by bringing the medium into contact with hot combustion gases. The feed stock is then brought into contact with the heat exchange medium in the absence of combustion gases. The result is the decomposition of the hydrocarbon material into carbon, hydrogen and small amounts of other gaseous hydrocarbon by-products. The carbon black is then separated from the hydrogen and other combustible by-products by filtering or electrostatic precipitation or centrifugal force or a combination of these methods.

The thermal process has the potentiality of producing relatively pure hydrogen as a by-product. Hydrogen could be produced in amounts which are more than sufficient to support the amount of combustion needed for heating the heat exchange medium. This advantage offers a theoretical possibility of obtaining very efficient operation, since a process by-product is utilized to produce the heat required in the process. As a practical matter, however, the operating efficiency attained through use of the thermal method has been disappointing.

The usual commercial practice has been a cyclical process; that is, the combustion gases and feed stock are separately passed over the surface of the heat exchange medium in alternation. Unfortunately, the usual heat exchange medium, refractory pebbles or brick checkerwork, captures and retains a large part of the carbon black produced each time the feed stock passes over its surface. When combustion gases are subsequently passed over the surface of the heat exchange medium to reheat it, the retained carbon black is consumed, with the result that as much as 50 percent of the theoretical yield of carbon black may be lost. Accordingly, there is a demand for improvements in the methods and apparatus currently utilized in the production of carbon black so that such product losses may be eliminated.

It is a principal object of this invention to fulfill the above demand. Other objects include the provision of methods and apparatus for thermally producing carbon black: (1) on a continuous basis; (2) in a fluidized reactor; (3) with relatively pure hydrogen free of combustion products as a by-product; and (4) in a reactor that is relatively small, inexpensive to build and simple to operate, considering its capacity. Other objects and advantages of the invention are discernible from the description which follows.

The above objects may be attained in a reactor having: a gas-tight shell divided into two adjacent non-communicating chambers by a heat transmitting member, one of said chambers being a heating chamber, the other a decomposition chamber; a generally horizontal permeable member located in each of the chambers, dividing it into upper and lower portions; a particulate heat exchange bed partially filling the upper portion of each chamber; an inlet in the lower portion of each chamber; means connected with the inlet of the heating chamber for introducing hot combustion gases into the bed in the heating chamber at a volume rate sufficient to fluidize the bed without entraining any bed particles, normal operating losses excepted; means connected with the inlet of the decomposition chamber for introducing a gasiform hydrocarbon feed stock into the bed in the decomposition chamber at a volume rate sufficient to fluidize the bed and to insure that carbon black produced in the decomposition chamber bed will be entrained in the gases exiting the bed without entraining any bed particles, normal operating losses excepted; and an outlet in each chamber above the upper limit of the bed when fluidized.

The method we have discovered for carrying out the objects of this invention involves: heating a first fluidized bed of particulate heat exchange material by passing hot combustion gases therethrough; transmitting heat from the first fluidized bed to a heat transmitting member by direct contact with the member; transmitting heat to a second fluidized bed isolated from the first by direct contact with said member; causing a hydrocarbon feed stock to pass through said second fluidized bed and thermally decompose; and recovering the decomposition products.

Figures 2, 3:
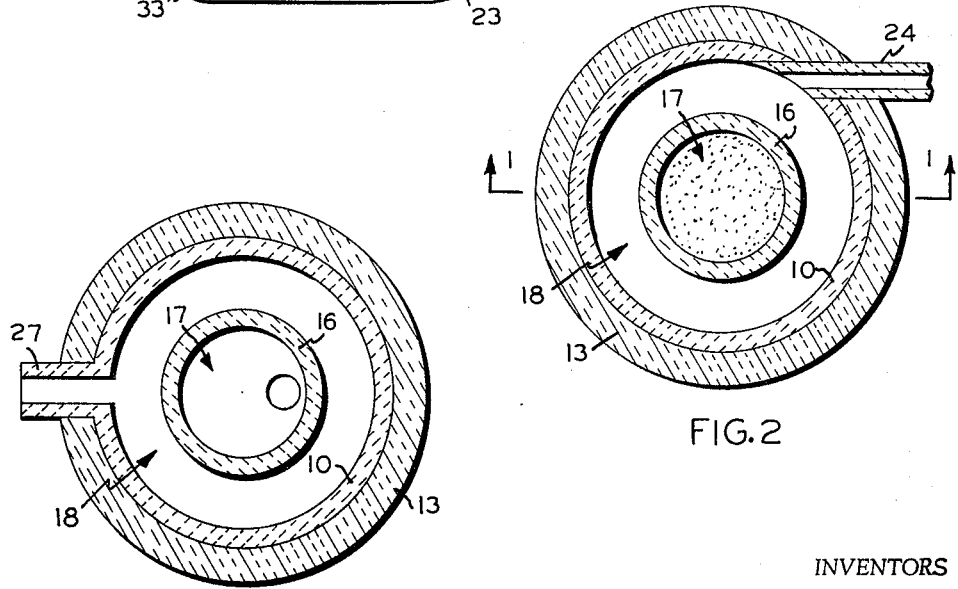

The reactor and method contemplated by the inventors will be illustrated by setting forth a description of the structure and mode of operation of a preferred form of reactor which is depicted in the accompanying drawing. Throughout the drawing a given numeral represents the same part in the several figures, and sectional views are taken in the directions designated by arrows on the section lines. In the drawing:

FIGURE 1 is a vertical section taken along section line 1—1 in FIGURE 2;
FIGURE 2 is a horizontal section taken along section line 2—2 in FIGURE 1;
FIGURE 3 is a horizontal section taken along section line 3—3 in FIGURE 1.

The preferred embodiment of our invention has an upwardly disposed, elongated cylindrical, gas-tight, refractory shell 10, closed off at its upper and lower ends by a top 11 and bottom 12. Its shape may be varied. Shell 10 is preefrably encased in insulating material, for instance, a refractory insulating material 13. The shell and insulating material are supported upon any kind of suitable support, such as base 14 and girders 15.

The interior of shell 10 is divided into two adjacent, non-communicating chambers by any suitable heat transmitting member, such as by a flat barrier wall, or by a duct of oval, rectangular, square or circular cross-section, such as the tube 16. The tube 16 extends from the top 11 down to the bottom 12 of shell 10, thus dividing it into two chambers 17 and 18. Chambers 17 and 18 constitute decomposition and heating chambers respectively. Chamber 17, within tube 16, does not communicate with chamber 18, but the walls of tube 16 are capable of transmitting heat from chamber 18 to chamber 17. Thus the tube 16 may properly be regarded as a heat transmitting means dividing the shell 10 into adjacent, non-communicating heating and decomposition chambers. Tube 16 may be constructed of any reasonably strong, heat resistant substance, such as Carbofrax (trade name) material.

In each of the chambers 17 and 18 there is a generally horizontal permeable member dividing the chambers into upper and lower portions. In the preferred form of apparatus, the major portion of the volume of each chamber lies above the permeable member. Thus, the volume included in chamber 17 is divided between a relatively small lower portion 19 and the remainder of the chamber by permeable member 20. The chamber 17, its lower portion 19 and permeable member 20 are of a cross-section as dictated by the configuration of the tube 16. The volume included in chamber 18 is divided between a relatively small lower portion 21 and the remainder of the chamber by permeable member 22. Chamber 18, its lower portion 21 and permeable member 22 are all of annular cross-section. The permeable members 20 and 22 may be made of any strong, temperature resistant material characterized by an open cell structure, of which K-T (trade name) silicon carbide foam is a preferred example.

That portion of each chamber which lies above its permeable dividing member is partly filled with a particulate heat exchange material. The invention is not restricted with regard to the chemical constituency, shape and size of the particles, but the particle size will ordinarily be less than about 10 mesh (U.S. Standard). The particles need not have any regular shape, but spherical or nearly spherical particles are preferred. The particles may be of a material such as iron or copper which has catalytic effects upon the decomposition of hydrocarbons, or the particles may be of inert material such as refractory particles. The chief requirements for the particulate heat exchange medium are that the particles should be heat and abrasion resistant and not too large or dense for successful use with fluidization techniques. The numerals 25 and 26 identify two separate beds of such particles in the chambers 17 and 18 respectively.

The lower portion of each chamber is provided with an inlet; that is, the inlet is located beneath each permeable member. Thus the lower portion 19 of chamber 17 is provided with axial inlet conduit 23. Lower portion 21 of chamber 18 is provided with a tangential inlet conduit 24. It is not essential that inlets 23 and 24 be axial and tangential, respectively. However, that form of organization is preferred; hence it is adopted in this preferred embodiment.

The invention requires a "means for introducing hot combustion gases into the bed in the heating chamber." This term is intended to refer not only to means which simply inject a fuel and an oxygen bearing gas into the reactor where combustion takes place, but also refers to means which burn a fuel outside the reactor and introduce the resultant combustion gases into the reactor. For example, the present embodiment is provided with a burner 29 having a fuel supply conduit 30. The burner is also provided with a blower 31 having an air inlet 32. The blower and burner are capable of generating hot combustion gases from air and fuel and of injecting them into the lower portion 21 of chamber 18. The gases have access to the bed through inlet conduit 24 and permeable member 21.

The precise types of blower and burner utilized are of no importance, since persons skilled in the art are aware of many different types which would readily serve the purposes of the invention. In fact, as implied above, it is not necessary that there be a burner located outside of the reactor. However, any blower and burner which may be used should be effective to propel combustion gases through the bed at a volume rate which is sufficient to fluidize the bed without entraining any of its particles, except for the small percentage of particles whose loss is as a practical matter unavoidable in normal operation.

The invention also requires "means for introducing a gasiform hydrocarbon feed stock into the bed in the decomposition chamber." This term is used to refer generally to any apparatus for delivering a hydrocarbon feed stock to the bed 25 in a gaseous, vaporized or atomized condition. Such apparatus is represented in the present embodiment by a blower 33, having an inlet 34 for a gaseous feed stock, and by inlet conduit 23 which communicates with the bed 25 through lower portion 19 and permeable member 20 of chamber 17. Here again, the exact form of blower used is of no consequence. However, it should have a volume delivery rate sufficient to fluidize bed 25 and to entrain any carbon black produced in the bed in the gases exiting the bed, without entraining any bed particles, except for normal losses.

In each chamber is an outlet. Since the beds 25 and 26 "swell" when fluidized, it is necessary that each of the outlets be located above the level reached by the top of the bed in its respective chamber when the bed is in a fluidized condition. Thus, outlet conduit 28 opens into the chamber 17 above bed 25 through the top 11 of shell 10. Outlet conduit 27 opens into chamber 18 above bed 26 through the cylindrical wall of shell 10 near the top.

The outlets 27 and 28 are customarily connected to product and heat recovery equipment, which is sufficiently familiar to those skilled in the art to obviate the need for illustrating it in the drawings. The outlet 27 may, for instance, be connected to one or more preheaters for feed stock, combustion air and fuel. The outlet 28 may be connected to an electrostatic precipitator, a bag filter, or a cyclone separator for separating carbon black from the effluent reactor gases. Hydrogen produced in chamber 17 may be recycled to the burner 29.

Persons skilled in the art will readily appreciate that the above apparatus can be operated in a variety of ways. However, we will now describe the method of our invention, which constitutes the preferred mode of operation of the above-described reactor.

The first step in our method is to heat a first fluidized bed of particulate heat exchange material by passing hot combustion gases therethrough. In this embodiment, fuel, such as natural gas, fuel oil, consumer gas or other hydrocarbon fuel, is supplied to the burner 29 along with an oxygen-bearing gas, such as air, enriched air or oxygen. The fuel is ignited and burned in the burner to produce combustion gases which are delivered to the lower portion 21 of chamber 18 via inlet conduit 24, as shown in FIGURE 2. The combustion gases circulate throughout the lower portion of the chamber and rise upwardly through the bed 26, heating it to a temperature of about 2,000° F.–3,000° F. The rate of combustion is controlled to maintain the bed 26 in a fluidized condition, but the volume rate of flow of the combustion gases is kept low enough to keep the particles in bed 26 from being entrained in the hot gases. After giving up a portion of their heat to the bed 26, to the tube 16 and to the interior walls of shell 10, the combustion gases pass out the outlet pipe 27 to air, fuel and feed stock preheaters (not shown).

The second step in our method is the transmission of heat from the first fluidized bed to a heat transmitting member by direct contact with the chamber. In this embodiment, the tube 16 is the heat transmitting member. Individual particles in fluidized bed 26 migrate throughout the bed coming in contact with the exterior surface of tube 16 at random intervals. Because there is a negative temperature differential between bed 26 and tube 16 under normal operating conditions, heat will be transmitted from the bombarding particles to the tube. Thus the bed transmits heat to the tube.

The third step in our method is the direct transmission of heat from the heat transmitting member to a second fluidized bed isolated from the first. Because the bed 25 is maintained in a fluidized condition, individual particles therein migrate throughout the bed, coming in contact from time to time with the interior surface of tube 16. Because a negative temperature differential exists between the tube 16 and the bed 25 under normal operating conditions, the tube 16 transmits heat to the particles which bombard it. Because the tube 16 prevents direct communication of gases or solids between the beds 25 and 26, except for minor leakage perhaps, the beds are isolated from one another.

The fourth step of our method is to cause a hydrocarbon feed stock to pass through the second fluidized bed and thermally decompose. Our method is not restricted to any particular feed stock. Generally any gaseous or liquid hydrocarbon may be employed in the apparatus. As used throughout the specification and claims, therefore, the term "hydrocarbon feed stock" is intended to include, generally, any hydrocarbon. Thus, natural gas as well as heavier hydrocarbon oils from both petroleum and non-petroleum sources may be employed. Such oils may contain aliphatic hydrocarbon compounds whether acyclic or cyclic, saturated or unsaturated or an aromatic hydrocarbon. Examples of suitable feed stocks include natural gas, propane, butane, acetylene, benzene, and gas oil. An inert diluent gas such as nitrogen, or an atomizing medium, such as natural gas or steam, may be mixed with the hydrocarbon prior to introduction of the hydrocarbon into the decomposition chamber 17. Such mixtures and their equivalents are embraced within the term "feed stock" as used throughout the specification and claims.

The feed stock is supplied at a rate which is sufficient to maintain the bed 25 in a fluidized condition. The feed stock enters blower inlet 34, is propelled by the blower 33 through conduit 23 into the lower portion 19 of chamber 17, from which it gains access to the bed 25 through permeable member 20. The feed stock is forced upwardly through the bed, maintaining it in a compact, suspended condition with the individual particles therein moving about in random fashion.

The moving particles have a temperature approaching 2,000° F.–3,000° F., their heat content being derived indirectly from the combustion gas and the particles in the first bed 18 via the walls of gas-tight tube 16. The aforesaid temperature is sufficient to cause the thermal decomposition of the feed stock. The decomposition reaction, which produces carbon black, hydrogen and other gaseous materials, consumes heat, so that the feed stock is constantly deriving heat from the bed 25.

The rate of feed stock injection is kept at a sufficiently high volume rate to insure that the carbon black will be entrained in the product gases and any remaining portions of the gasiform feed stock as they sweep out of the bed 25 and chamber 17 through outlet 28. The volume rate is not however maintained at such a high level that any substantial amount of the bed particles will be entrained therein.

The fifth and final step in our method is the recovery of carbon black entrained in the gases exiting the reactor. The carbon black-laden gases are conveyed from outlet pipe 28 to any conventional recovery equipment, and the carbon black and gaseous products are separated.

Among the advantages of our invention are the production of thermal black on a continuous basis with an increase in yield. The hydrogen produced by the reaction is available, in an almost pure state, for collection or burning. The unusually high heat utilization efficiency and rate of heat transfer provided by the invention enable the entire heat requirement for the decomposition reaction to be maintained once stable operating conditions are attained solely by burning the gaseous by-products.

Having described specific embodiments of our novel methods and apparatus, we wish it understood that the various details of construction and operation given herein are given by way of illustration only and that they should not be construed as unnecessarily limiting the appended claims which are intended to encompass the full scope of our invention.

What we desire to protect by United States Letters Patent is.

1. Apparatus for the production of carbon black, including: a gas-tight shell, the confined space within which is divided by a vertical heat transmitting member into a heating chamber and at least one adjacent non-communicating decomposition chamber; a generally horizontal permeable member located in each of said chambers dividing it into upper and lower portions; a particulate heat exchange bed partially filling the upper portion of each of said chambers; an inlet in the lower portion of each of said chambers; means connected with the inlet of said heating chamber for introducing hot combustion gases into the bed thereof at a volume rate sufficient to fluidize said bed without substantial entrainment of bed particles; means connected with the inlet of said decomposition chamber for introducing a gasiform hydrocarbon feedstock into the bed thereof at a volume rate sufficient to fluidize said bed and to insure that carbon black produced in said fluidized bed will be entrained in the gases exiting said bed without substantial entrainment of bed particles; and an outlet in each of said chambers above the upper extremities of said beds when said beds are fluidized.

2. Apparatus according to claim 1 wherein said shell is a hollow cylindrical body.

3. Apparatus according to claim 1 wherein said heat transmitting member is a tubular member.

4. Apparatus according to claim 1 wherein said shell and heat transmitting means are a hollow cylindrical body and a co-axial tube situated within said cylindrical body, respectively.

5. Apparatus according to claim 4 wherein the heating chamber inlet is tangentially disposed.

6. Apparatus according to claim 4 wherein the inlet to said decomposition chamber is axially disposed.

7. A method for the production of carbon black which comprises: heating a first fluidized bed of particulate heat exchange material by passing hot combustion gases therethrough; transmitting heat from said first fluidized bed to a heat transmitting member by direct contact therewith; transmitting heat from said member to a second fluidized bed, isolated from said first fluidized bed, by direct contact with said member; passing a gasiform hydrocarbon feedstock through said second fluidized bed, thereby decomposing said hydrocarbon feedstock into carbon black and gaseous decomposition products; and separating said carbon black from said decomposition products.

8. A method in accordance with claim 7 wherein at least a portion of the gaseous decomposition products from which said carbon black is separated are recycled and burned to produce hot combustion gases for heating said first fluidized bed.

9. A method in accordance with claim 7 wherein all of the heat required for said decomposition is produced by burning said gaseous-decomposition products.

References Cited by the Examiner
UNITED STATES PATENTS

| | | | |
|---|---|---|---|
| 1,390,480 | 9/1921 | Bancroft | 23—209.4 |
| 3,060,004 | 10/1962 | Whitsel | 23—259.5 |
| 3,186,796 | 6/1965 | Williams | 23—209.4 |

OSCAR R. VERTIZ, *Primary Examiner.*

E. J. MEROS, *Assistant Examiner.*